US005760323A

United States Patent [19]

Romero et al.

[11] Patent Number: 5,760,323

[45] Date of Patent: Jun. 2, 1998

[54] NETWORKED ELECTRONIC MUSIC DISPLAY STANDS

[75] Inventors: Ernest Romero, Canon City; Gary Fitzpatrick, Florence, both of Colo.

[73] Assignee: Music Net Incorporated, Grand Junction, Colo.

[21] Appl. No.: 672,517

[22] Filed: Jun. 20, 1996

[51] Int. Cl.[6] .......... G09B 15/00

[52] U.S. Cl. .......... 84/470 R; 84/471 R; 84/609

[58] Field of Search .......... 84/470 R, 471 R, 84/477 R, 483.1, 486, 609, 612, 634, 636

[56] References Cited

U.S. PATENT DOCUMENTS

| | | | |
|---|---|---|---|
| 4,024,789 | 5/1977 | Humphrey et al. | 84/477 R |
| 4,048,634 | 9/1977 | Laflamme | 340/337 |
| 4,064,782 | 12/1977 | Laflamme | 84/477 R |
| 4,257,306 | 3/1981 | Laflamme | 84/485 R |
| 4,281,579 | 8/1981 | Bennett, Sr. | 84/478 |
| 4,297,934 | 11/1981 | Imamura et al. | 84/1.03 |
| 4,321,853 | 3/1982 | Tumblin | 84/454 |
| 4,350,070 | 9/1982 | Bahu | 84/1.03 |
| 4,457,203 | 7/1984 | Schoenberg et al. | 84/454 |
| 4,546,690 | 10/1985 | Tanaka et al. | 84/477 R |
| 4,700,604 | 10/1987 | Morikawa et al. | 84/1.03 |
| 4,768,412 | 9/1988 | Sanderson | 84/1.1 |
| 4,958,551 | 9/1990 | Lui | 84/462 |
| 5,046,004 | 9/1991 | Tsumura et al. | 364/419 |
| 5,048,390 | 9/1991 | Adachi et al. | 84/464 R |
| 5,074,182 | 12/1991 | Capps et al. | 84/609 |
| 5,127,303 | 7/1992 | Tsumura et al. | 84/609 |
| 5,146,833 | 9/1992 | Lui | 84/462 |
| 5,604,322 | 2/1997 | Kikuchi | 84/477 R |

*Primary Examiner*—Jonathan Wysocki
*Assistant Examiner*—Jeffrey W. Donels
*Attorney, Agent, or Firm*—Sheridan Ross P.C.; Douglas W. Swartz; Gary J. Connell

[57] ABSTRACT

The present invention is directed to an electronic display stand that can advance through musical notes without interrupting a musician's performance. The stand can be controlled by remote mechanical actuation, the sound of musical notes, or a timed interval. The device can have a display large enough to display a full page of sheet music at one time. A plurality of the devices can be networked to simultaneously display musical notes to a number of musicians. The electronic display stand is a multi-function device that can be used for displaying more than just music.

22 Claims, 23 Drawing Sheets

NETWORKED ELECTRONIC MUSIC DISPLAY STANDS

FIELD OF THE INVENTION

The present invention is generally directed to display stands and specifically to electronic display stands.

BACKGROUND OF THE INVENTION

The convenient storage and handling of written music has long been a problem for musicians. The traditional storage medium for music is to print the music on paper compiled in a pamphlet (known as "sheet music"). Sheet music has a number of drawbacks. It can be voluminous to store, especially for extensive musical libraries. It can be awkward to use. The musician must periodically cease playing his instrument to turn sheet music pages, which can interrupt his performance. The problem becomes more significant as the sheet music becomes progressively more dog-eared, brittle, and torn during use. It is easily knocked off display stands, which are generally relatively unstable. In outdoor performances especially, wind can dislodge sheet music from the display stand.

In one attempt to resolve these problems, U.S. Pat. No. 4,350,070 to Bahu discloses an electronic music book which is a computer device that clips to a display stand. The music book has a memory, central processor, keyboard, and display for viewing musical notes. The music book, however, like sheet music, has a number of drawbacks. The music book display does not appear to be able to display a full page of sheet music at once. As a result, the musician would have to interrupt his performance even more frequently than with sheet music to depress the appropriate key to scroll to the next screen. The music book also suffers from limited memory capacity. To add additional songs to the permanent memory, read-only memory modules containing off-the-shelf music must be installed on the book. Although musicians can use the book to compose or input their own songs, the songs appear to be stored in the temporary and not the permanent memory of the device. Accordingly, the songs would be lost when the book is turned off or loses power. Finally, the book appears to be limited for use only by musicians and therefore is only a single purpose device.

SUMMARY OF THE INVENTION

It is therefore an objective of the present invention to provide a music display device that is convenient to use. A related objective is to provide a device that eliminates the use of paper sheet music.

It is a further objective to provide an electronic music display device that can scroll through musical notes without the musician interrupting the operation of his musical instrument. Related objectives are to provide an electronic music display device having a sufficient memory capacity to store both off-the-shelf music and works originally composed by the musician and a display having a sufficient size to display a full page of sheet music at one time.

These and other objectives are addressed by the electronic display stand of the present invention. In one embodiment, the stand is portable and includes: (i) memory means for storing a plurality of musical notes; (ii) central processing means for accessing the memory means to retrieve the musical notes from the memory means and store one or more additional musical notes in the memory means; (iii) display means for displaying musical notes retrieved by the central processing means; and (iv) actuator means for advancing a displayed musical score. To minimize interruptions of a musician's musical performance due to scrolling, the actuator means is actuated by at least one of remote mechanical actuation, the sound of a portion of the musical notes, and a timed interval.

The memory means has a sufficient capacity to store off-the-shelf and original works. The memory means can include a hard drive for permanent storage of such works. The memory means permits the musician to modify existing musical works and/or compose original works.

To permit simultaneous viewing of two different pages of sheet music, the display means can include two separate screens. The screens are adjacent to one another for convenient viewing.

The actuator means can be external to the housing of the stand and even be located at a distance from the stand. In one configuration, the actuator means is mounted on the musical instrument. In another configuration, the actuator means is actuated by a foot of the musician.

The stand can further include a number of peripheral devices. For example, the stand can include a scanning means in communication with the central processor means for inputting musical notes into the memory means and/or an external printer for outputting musical notes, especially originally composed musical notes.

In another embodiment, a system is provided for simultaneously providing musical notes to a plurality of musicians. The system includes: (i) a computer including a memory means containing a plurality of musical notes corresponding to a musical composition and (ii) a plurality of display means for displaying the musical notes to a plurality of musicians at the same time. This embodiment is especially useful for large bands or orchestras having different instrumental sections that require the display means to be remotely located from the computer. The conductor, for example, can control the musical notes displayed on all of the display means by controlling the computer. To permit a lead musician in an instrumental section to control the displayed musical notes on the display means of the other musicians in the section, one of the display means can control the display of musical notes on one or more other display means.

In band or orchestral applications, the computer can provide one or more of the display means with different musical notes at the same time to permit simultaneous viewing of different musical notes by musicians playing different instruments. In this situation, it is possible for two or more of the display means to advance through displayed musical notes at different rates.

In yet another embodiment, the present invention provides a portable device for storing and retrieving information during a presentation. The device includes: (i) memory means for storing selected information; (ii) central processing means for accessing the memory means to retrieve the information from the memory means and store additional information in the memory means; (iii) display means for displaying the retrieved information; and (iv) a housing for enclosing the memory means, central processing means and display means. This device can be used not only for musical presentations but also for non-musical presentations, such as public speaking engagements, seminars, and the like.

The display means has a height in excess of its width to permit, in musical applications, the display of a full page of sheet music at one time. The display means is preferably no less than about 8.5 inches in width and no less than about 11 inches in height.

The device can include a projector means located within the housing for projecting the retrieved information on the display onto a viewing surface.

DETAILED DESCRIPTION

Figure 1:
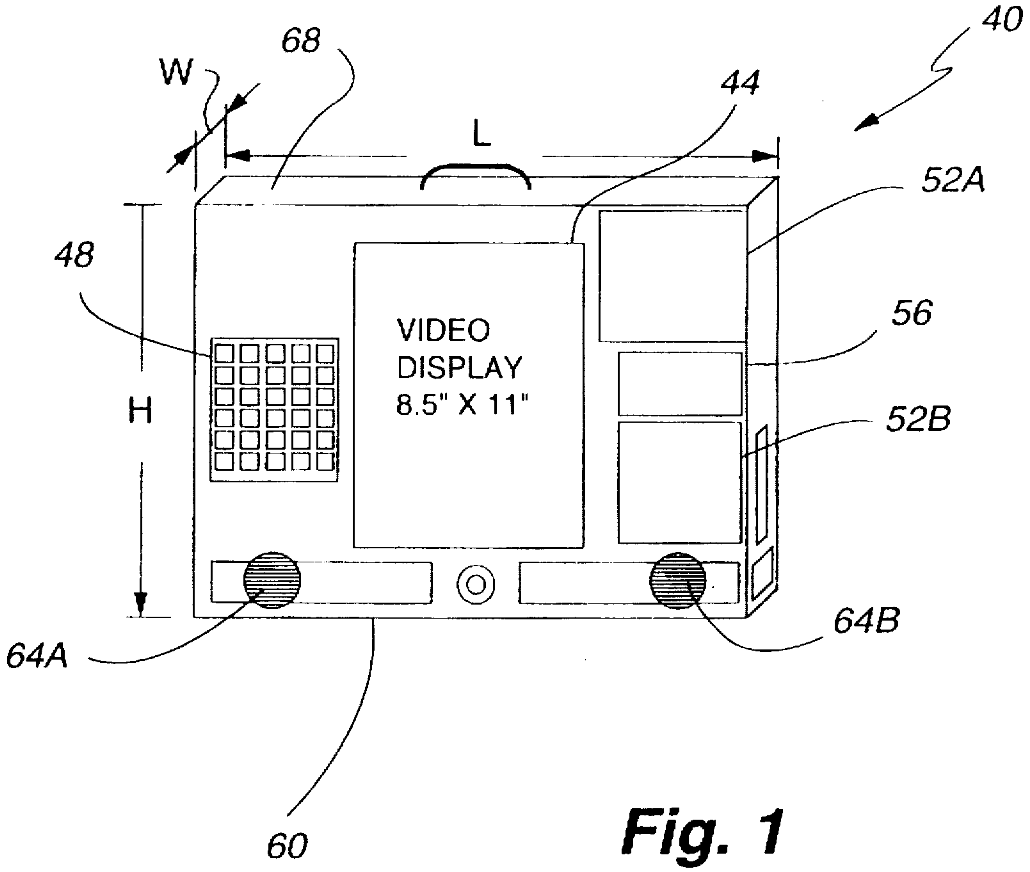
FIG. 1 is a front view of an electronic display stand according to a first embodiment of the present invention.

Referring to FIGS. 1–4, in a preferred (first) embodiment the portable electronic display stand 40 includes a display means 44, a keyboard 48, disk drives *52a,b*, memory means 56, power supply 60, and speakers *64a,b* enclosed in a housing 68. The display stand 40 is portable, preferably having a width "W" of no more than about 2.5 inches, a height "H" of no more than about 14 inches and a length "L" of no more than about 16 inches and a weight of no more than about 6 lbs.

To accommodate a full page of sheet music at one time, the display means 44 is at least 8.5 inches wide and 11 inches high. The display software is programmed to provide a portrait display as opposed to a landscape display. The portrait display enhances the ability to display a full page of sheet music at any one time. The display means 44 preferably has a white background with black musical notes to replicate the appearance of sheet music.

Figure 2:
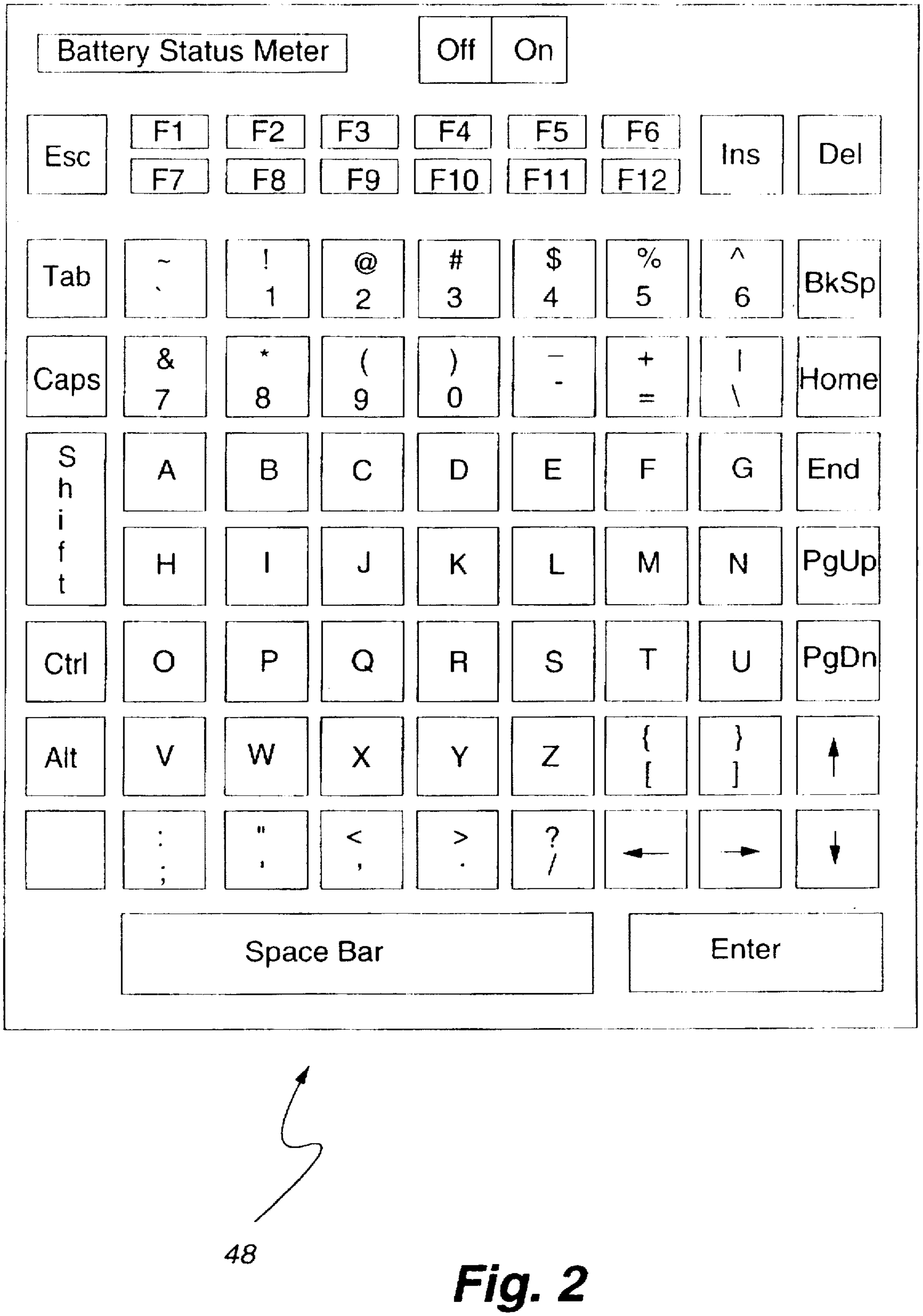
FIG. 2 is a front view of the keyboard of the first embodiment.

FIG. 2 is an enlarged view of the keyboard 48. The keyboard 48 is configured as a standard computer keyboard for the convenience of the user. A template showing the keys corresponding to various musical notes can overlay the keyboard 48 to permit musicians to compose original works.

Referring again to FIG. 1, the disk drives *52a,b* are preferably conventional floppy disk and/or CD-ROM drives and the memory means 56 is a permanent data storage medium such as an internal hard drive. Musical notes for existing songs can be downloaded into the memory means 56 using one of the disk drives *52a,b*. Additionally, original works of the user can be copied onto floppy disk or recordable CD-ROM for long term storage. Preferably, the memory means 40 contains at least about 340 MB and preferably about 540 MB of storage.

The power supply 60 can be any durable batteries. Preferably, the power supply 60 is dual nickel/cadmium batteries. The cover of the power supply 60 can be removed to permit replacement or recharging of the power supply 60.

The speakers *64a,b* permit the electronic display stand 40 to play musical notes of any work stored in the memory means, whether original or copied works. This is a valuable feature for the beginning musician or the musician composing original works.

Figure 3:
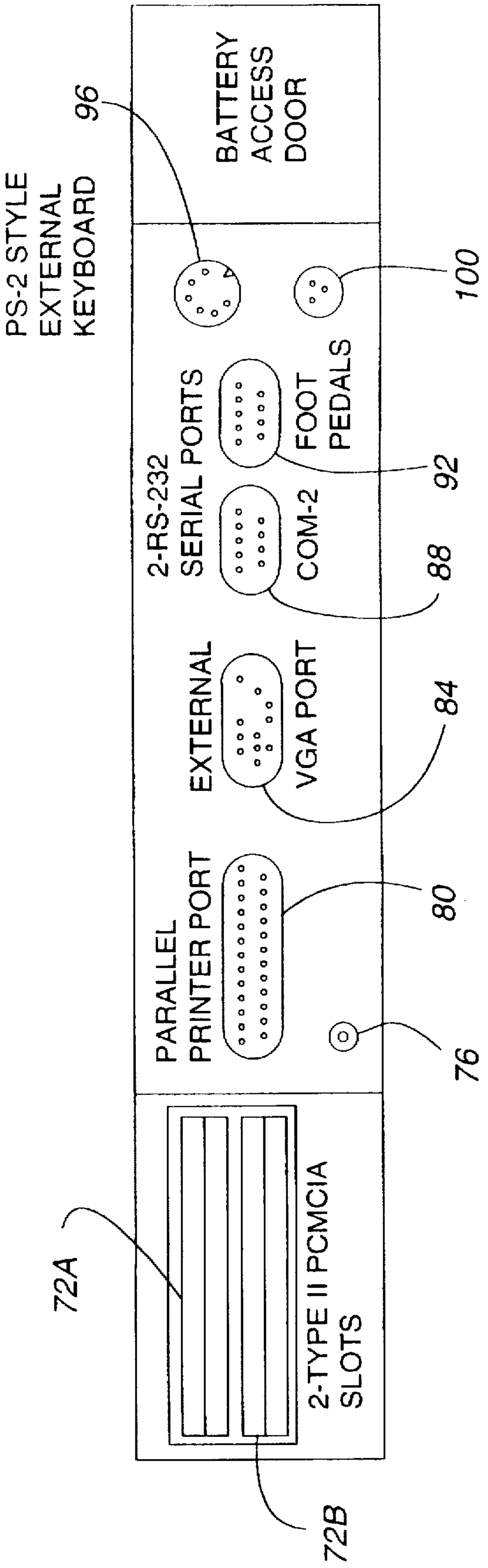
FIG. 3 is a left side view of the electronic display stand of the first embodiment.

FIG. 3 is a left side view of the electronic display stand 40. The stand 40 includes expansion slots *72a,b*, external speaker jack 76, parallel printer port 80, external video graphics adaptor ("VGA") port 84, one or more serial ports 88, actuator means port 92, external keyboard port 96, and external AC adapter/charger port 100. Additional ports can be added as desired to increase the capabilities of the stand 40.

Figure 5:
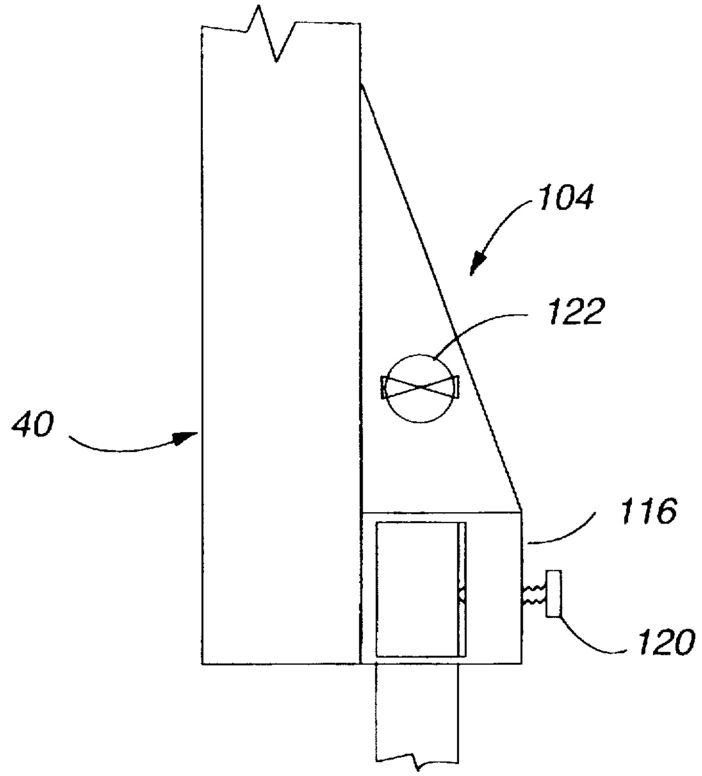
FIG. 5 is a view of the mounting device for mounting the electronic display stand on a stand.
Figure 6:
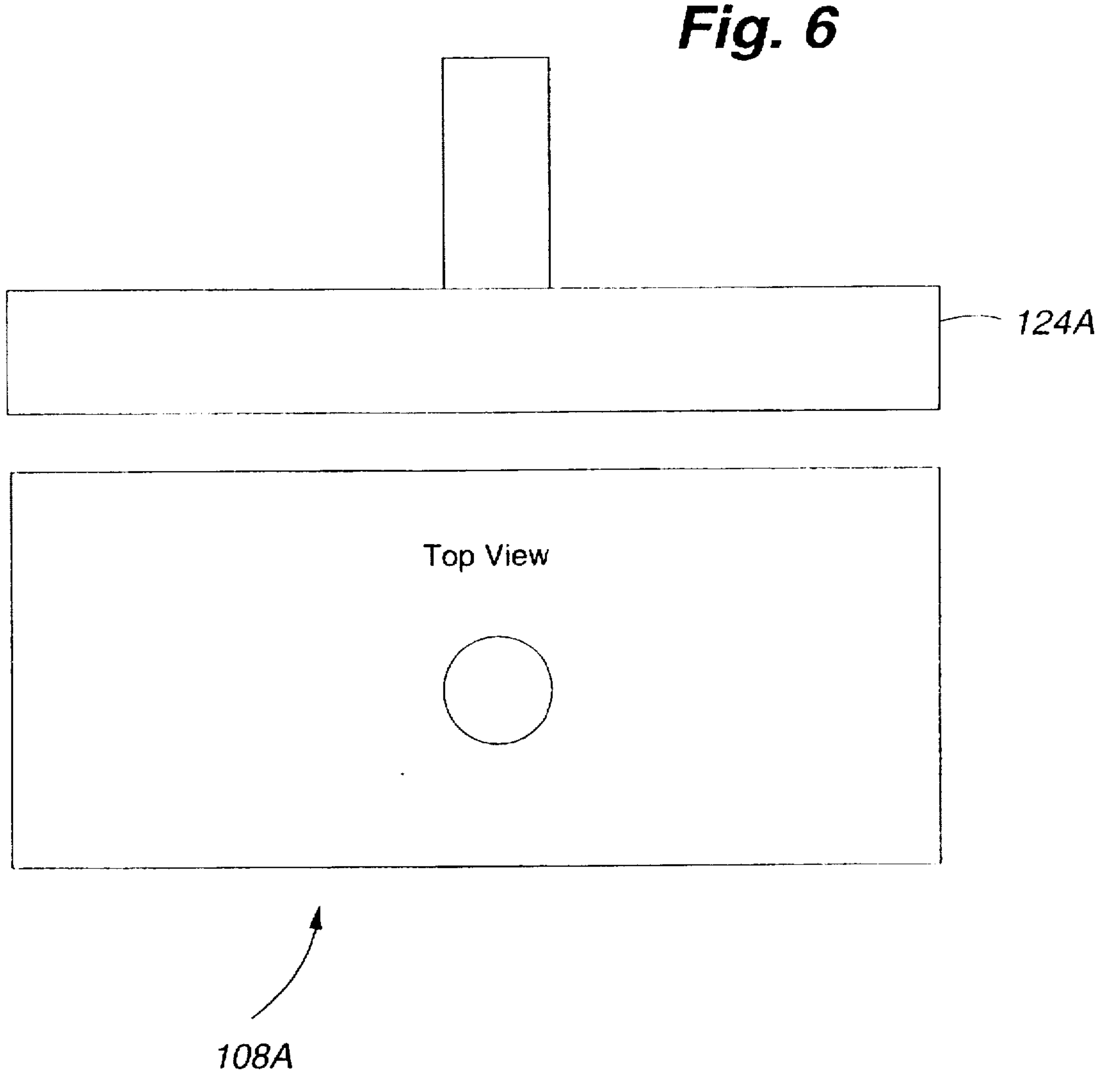
FIG. 6 is a view of a stand for receiving the mounting device.
Figure 7:
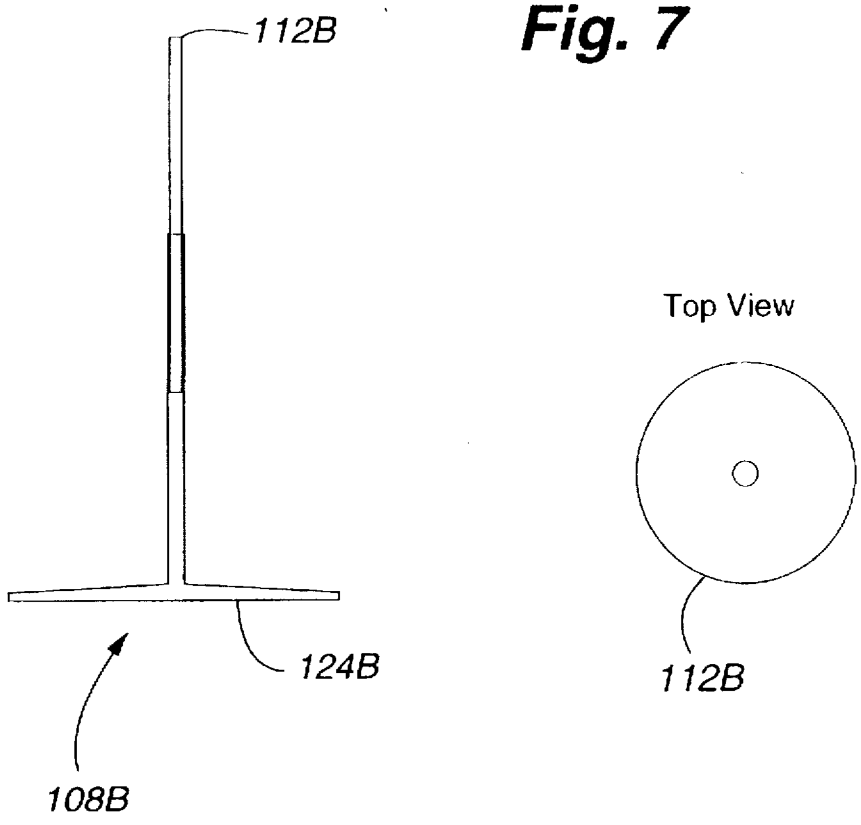
FIG. 7 is an exploded view of the base of the stand.

Referring to FIGS. 5–7, the mounting device 104 on the electronic display stand 40 for mounting the display stand 40 on either a desktop or floor stand *108a,b* is depicted. The top *112a,b* of the stand is received within the base connector 116 and secured in position by a mechanical fastener 120 such as a screw. The display stand 40 can be tilted to a desired angle by loosening a lock 122. When the display stand 40 is in the desired position, the lock 122 is tightened to hold the display stand 40 in position. The bases *124a,b* of the stand 40 can be weighted for stability and cushioned with felt or rubber base pads to avoid damaging the desk or floor. The floor stand *108b* is telescopic to permit it to be adjusted to a variety of different heights.

Figure 8A:
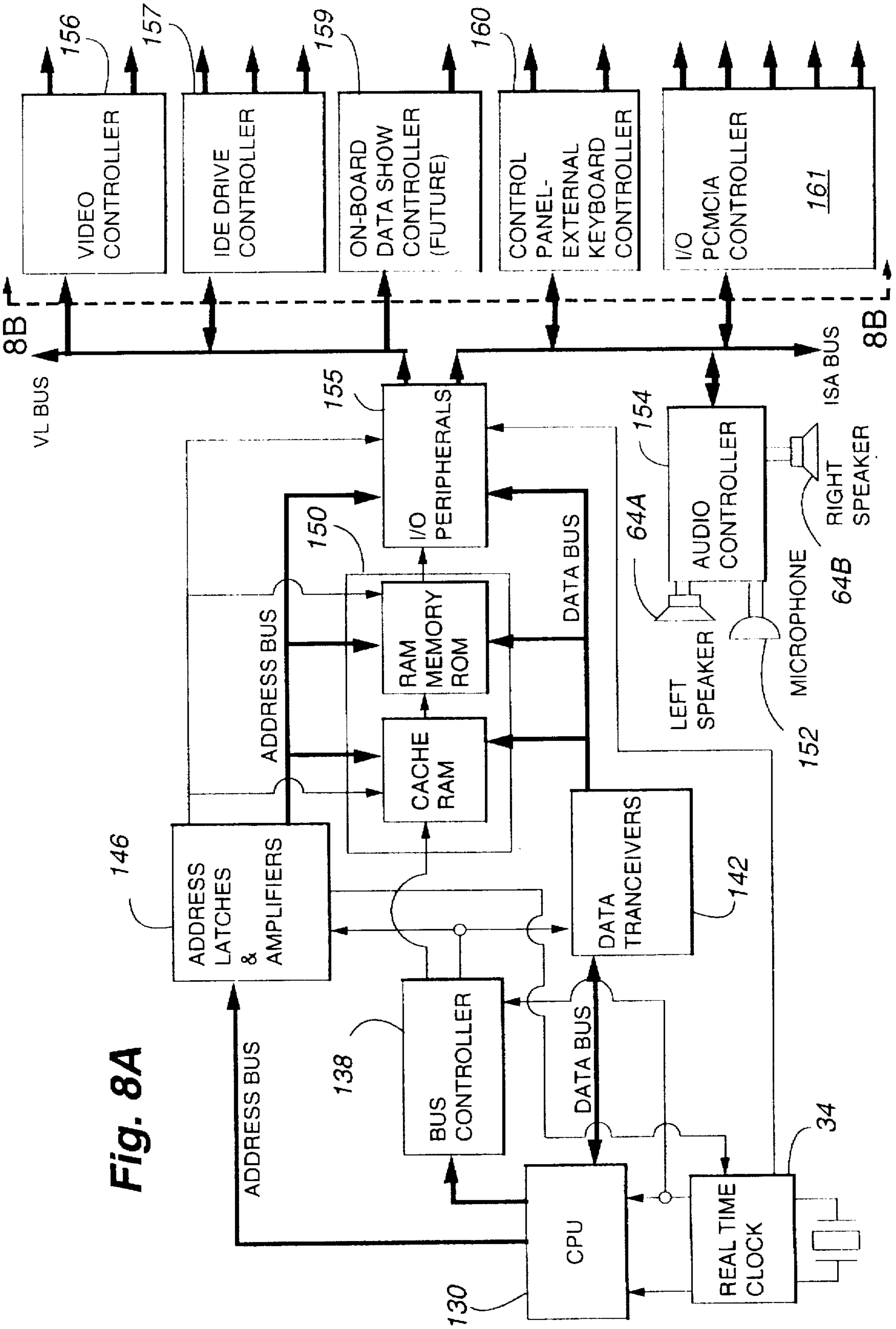
FIG. 8 is an electrical flow schematic of the electronic display stand of the first embodiment.

FIGS. 8A and B are electrical flow schematics of the electronic display stand 40 showing many of the above-described elements. As can be seen from FIGS. 8A and B, the electronic display stand 40 includes a central processing means 130 in communication with various on-board components, namely the clock 134, bus controller 138, data transceivers 142, address latches and amplifiers 146, memory 150, audio controller 154, display means 44, speakers *64a,b*, microphone 152, disk drives *52a,b* and 56, trackball 178, and keyboard 48, input/output peripherals 155, video controller 156, integrated drive electronics ("IDE") drive controller 157, on-board data show controller 159, control panel-external keyboard controller 160, input/output personal computer memory card international association ("PCMCIA") controller 161, and with one or more optional peripheral components, namely a printer 162, an external monitor 166, an external keyboard 170, an actuator means 174, and projector means 440 (discussed below).

The actuator means 174 advances the musical notes displayed on the display means 44 either forward or backward through the musical notes while permitting the musician to continue playing a musical instrument. The actuator means 174 thus frees the musician from interrupting his performance to turn sheet music or depress a scroll button on the keyboard of the music book to advance the displayed musical notes.

The actuator means 174 can be actuated by remote mechanical actuation or automatically, such as by the sound of a portion of the musical notes displayed on the display means 44, or by a timed interval. As used herein, "remote" means that the actuator means 174 is external to the housing 68.

Figure 4:
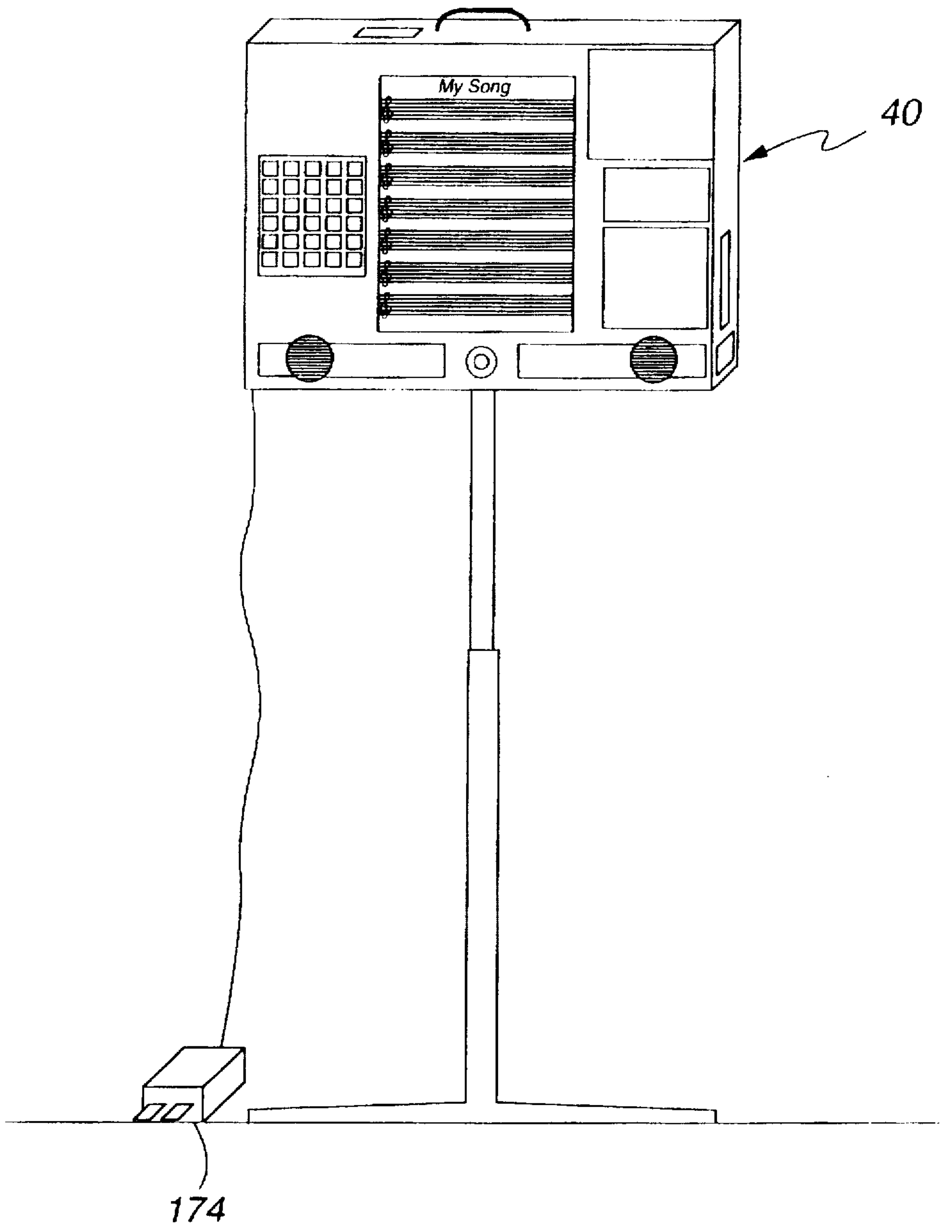
FIG. 4 is a front view of the stand of the first embodiment connected to an actuator device.

Remote mechanical actuation can be provided by a foot operated actuator 174, as shown in FIG. 4, or a hand operated actuator mounted on the musical instrument to permit ease of access. By way of example, a hand operated actuator can be a button-operated electronic switch or wireless transmitter. A terminate and stay resident program monitors the operation of the mechanical actuator means 174 and provides information to the central processing means 130 for control of the displayed musical notes in response to commands of the actuator means. The foot operated actuator or hand operated actuator is connected to an interface card slot. It can include two momentary single pole switches to permit forward and backward scrolling.

For remote mechanical actuation, the actuator means 174 can be located at a distance from the electronic display stand 40 at the musician's discretion. For performances requiring physical movement over a relatively large area, the actuator mean 174 can be a wireless transmitter mounted on the musical instrument with a receiver in the stand 40 in communication with the central processing means. For performances requiring little or no movement from a fixed location, the actuator means 174 can be a foot actuator located near the musician.

Sound actuation requires sound translation software, such as a terminate and stay resident software program, in the stand 40 to receive the musical sounds and translate them into musical notes. When the musical notes are played by the musician, the sound translation software translates the sounds into a sequence of musical notes. When the sequence of musical notes matches a selected sequence of musical notes at the end of the page of sheet music, the display means 44 advances to the next page of sheet music. A different set of musical sounds, or musical notes, is potentially involved for each page of sheet music on the display means 44. It is preferred that the set or sequence of musical notes triggering advancement be at or near the last line of musical notes on the displayed page.

The display means 44 can also automatically advance the displayed musical notes after a selected period of time. The musician programs the timed interval into the central processing means 130 before his performance. The interval is based upon a predetermined rate at which the musician advances through the musical notes during his performance (i.e., the beat or tempo of the song).

Both the sound actuation and timed interval permit the central processing means 130 to scroll forward but not backward through the musical notes. As will be appreciated, only the remote mechanical actuation has the capability of not only advancing forward but also backward through the displayed musical notes.

Figure 8B:
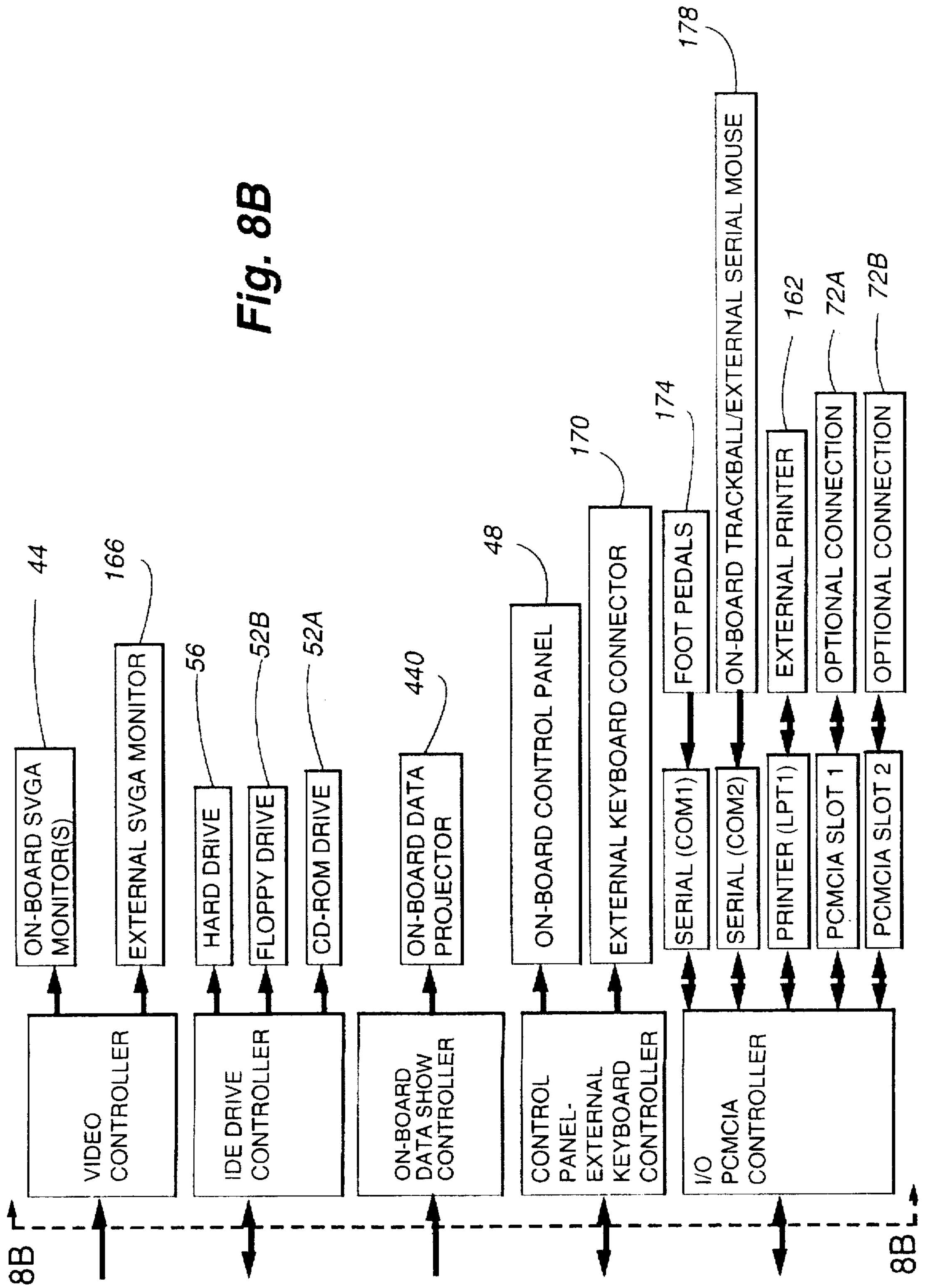
Figure 9:
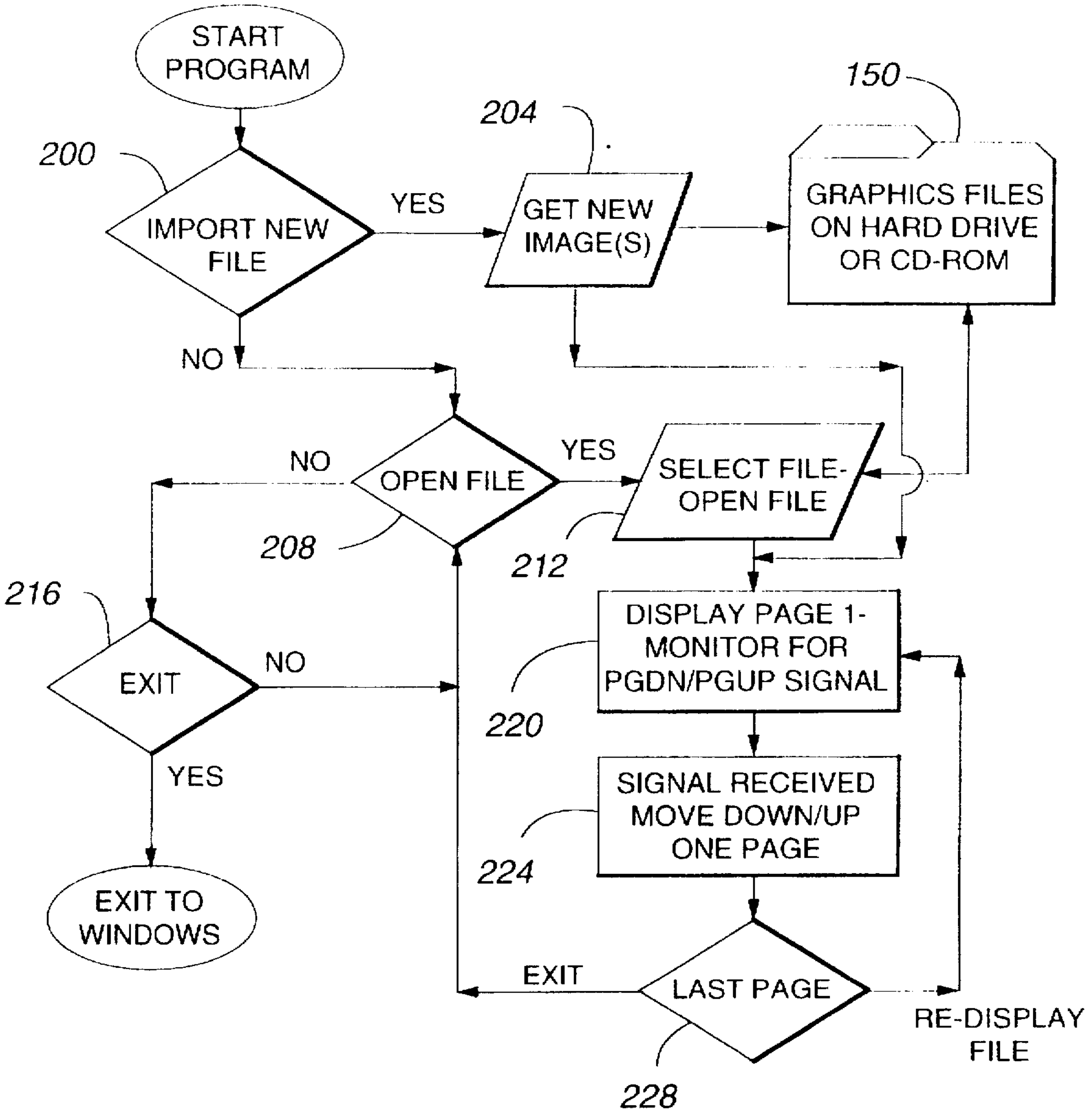
FIG. 9 is a flow schematic of the software operating the electronic display stand.

Referring to FIGS. 8*A–B* and 9, the operation of the electronic display stand will be described.

In decision box 200, the musician first determines whether a new file is to be imported by the central processing means 130 from a disk drive 52. If so, the file is identified by the musician and the central processing means 130 in command box 204 retrieves the file. If not, the musician in decision box 208 determines whether a file is to be selected from the memory means 56. If so, the musician in command box 212 selects the file. If not, the musician in decision box 216 determines whether he desires to exit from the program. If so, the central processing means 130 returns to a disk operating system or a database manager, such as the database manager sold under the trademark "WINDOWS". Normally, the file is identified by a unique identifier, such as a numerical code.

After the appropriate file is selected and displayed, in command box 220 the central processing means 130 transmits a page of the musical piece to the display means 44 for viewing by the musician. The central processing means 130 then monitors the keyboard 48 and actuator means 174 for a scroll signal. When the signal is received, the central processing means 130 in command box 224 advances to a succeeding page or returns to a preceding page, as commanded.

After the last page of musical notes for the current file is displayed, in decision box 228 the musician is requested whether the central processing means 130 should exit the current file. If so, the central processing means 130 returns to decision box 208. If not, the central processing means 130 returns to command box 220 and displays page 1 of the current file and the described steps are repeated.

There are a number of alternative embodiments of the present invention. Each of the embodiments have one or more features that are not present in the preferred embodiment.

Figure 10:
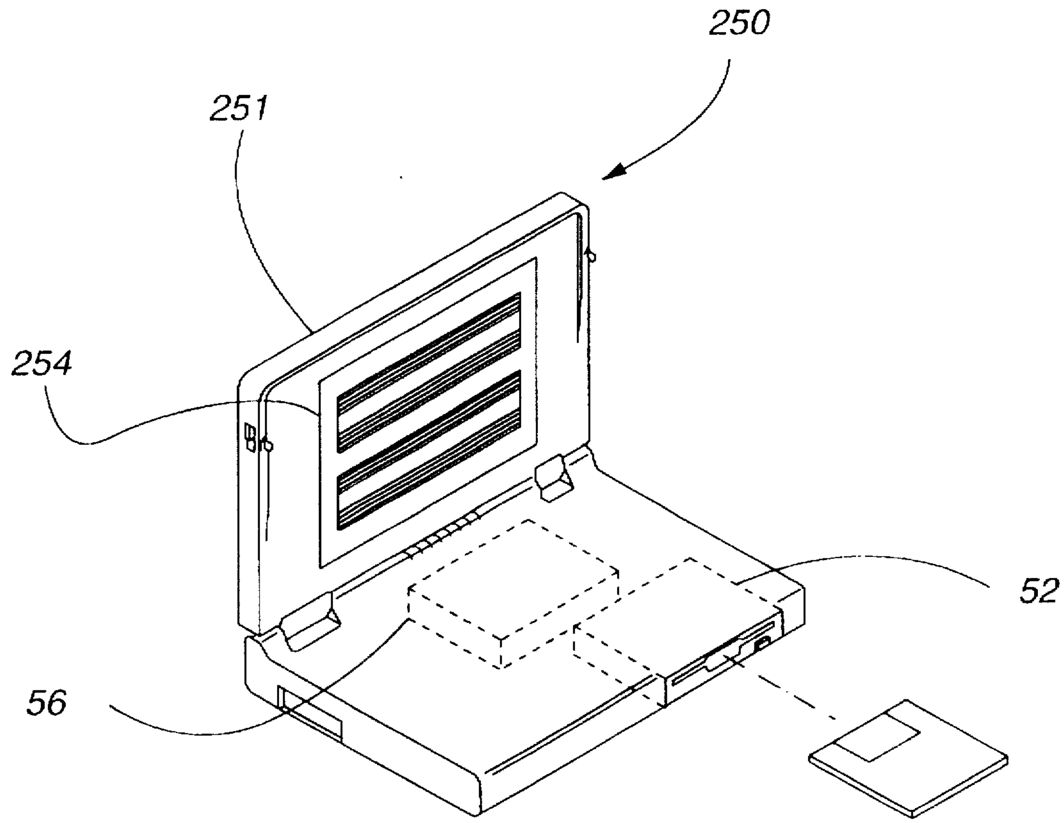
FIG. 10 is a view of an electronic display stand according to a second embodiment of the present invention with foot pedals attached.
Figure 11:
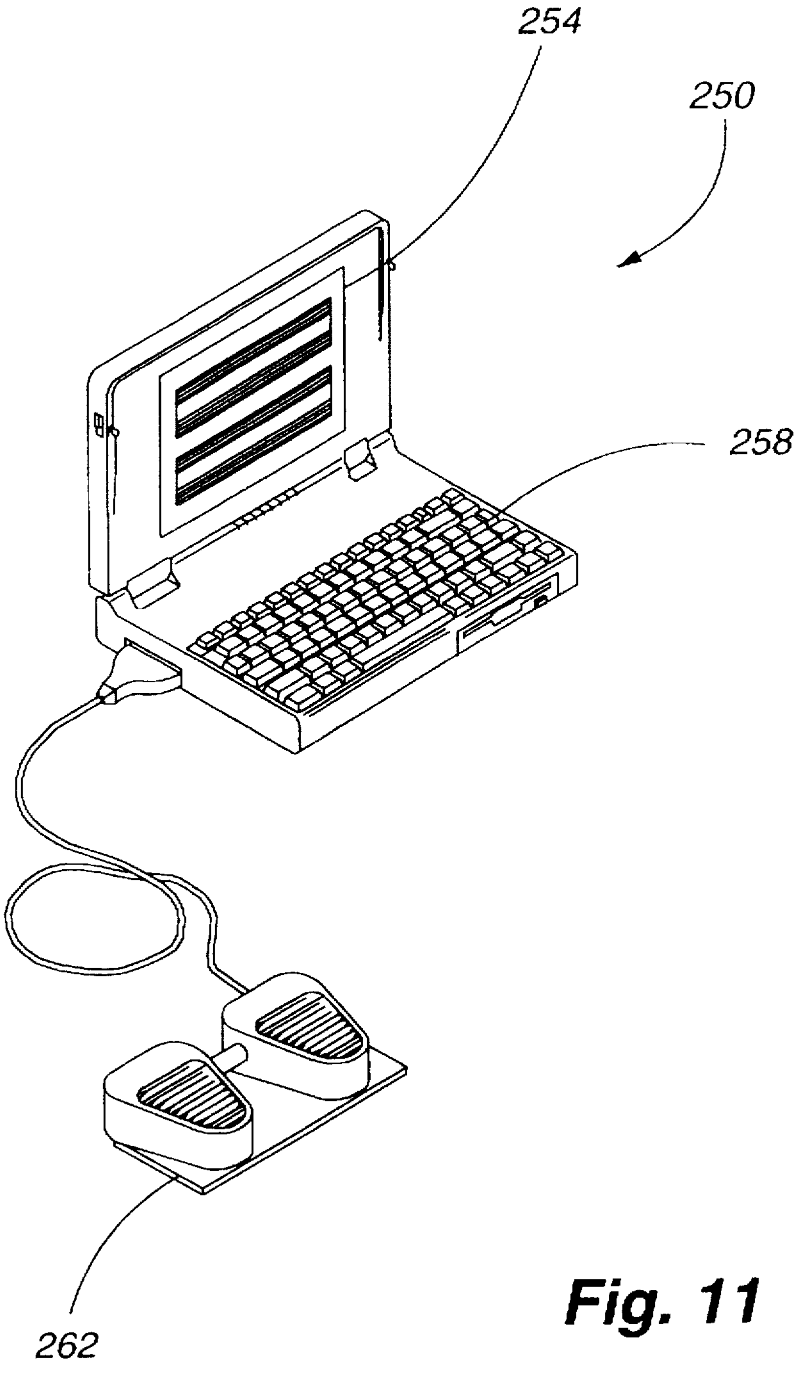
FIG. 11 is a cutaway view of the electronic display stand of the second embodiment showing a hard drive and disk drive.
Figure 12:
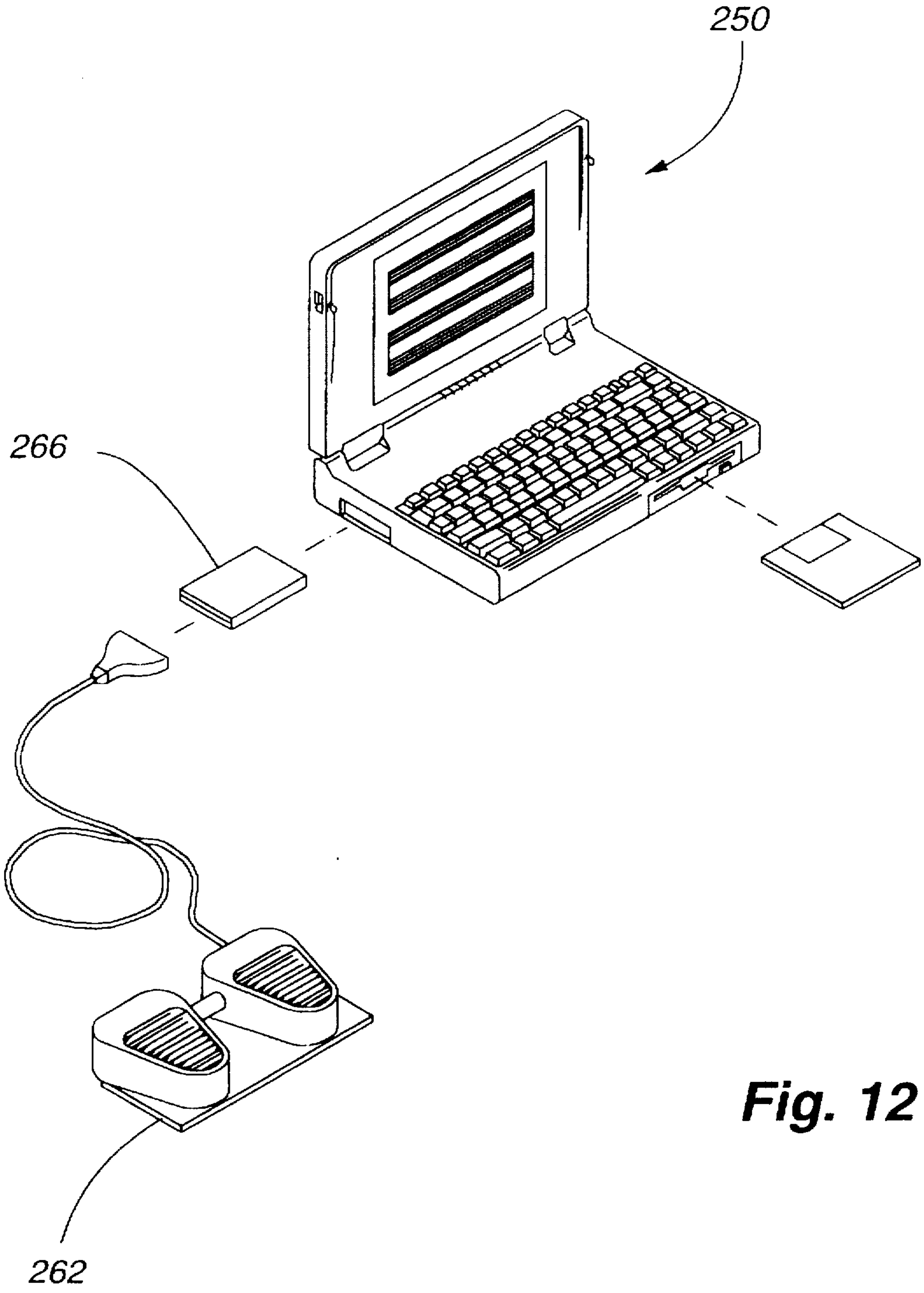
FIG. 12 is another view of the electronic display stand of the second embodiment showing the attached foot pedals and pedal interface card.

In a second embodiment shown in FIGS. 10–12, for example, the electronic display stand 250 has a clamshell-type housing 251 that opens to reveal the display means 254 and keyboard 258 and is attached to a foot operated actuator means 262. The clamshell-type housing 251 protects the display means 254 from damage when the device is not in use. The actuator means 262 connects to the side of the stand 250. An actuator means interface card 266 in the input/output PCMCIA controller 161 is contained within the stand 250 to connect to the actuator means 262. The actuator means 262 has dual foot switches to advance the displayed musical notes either forward or backward.

Figure 13:
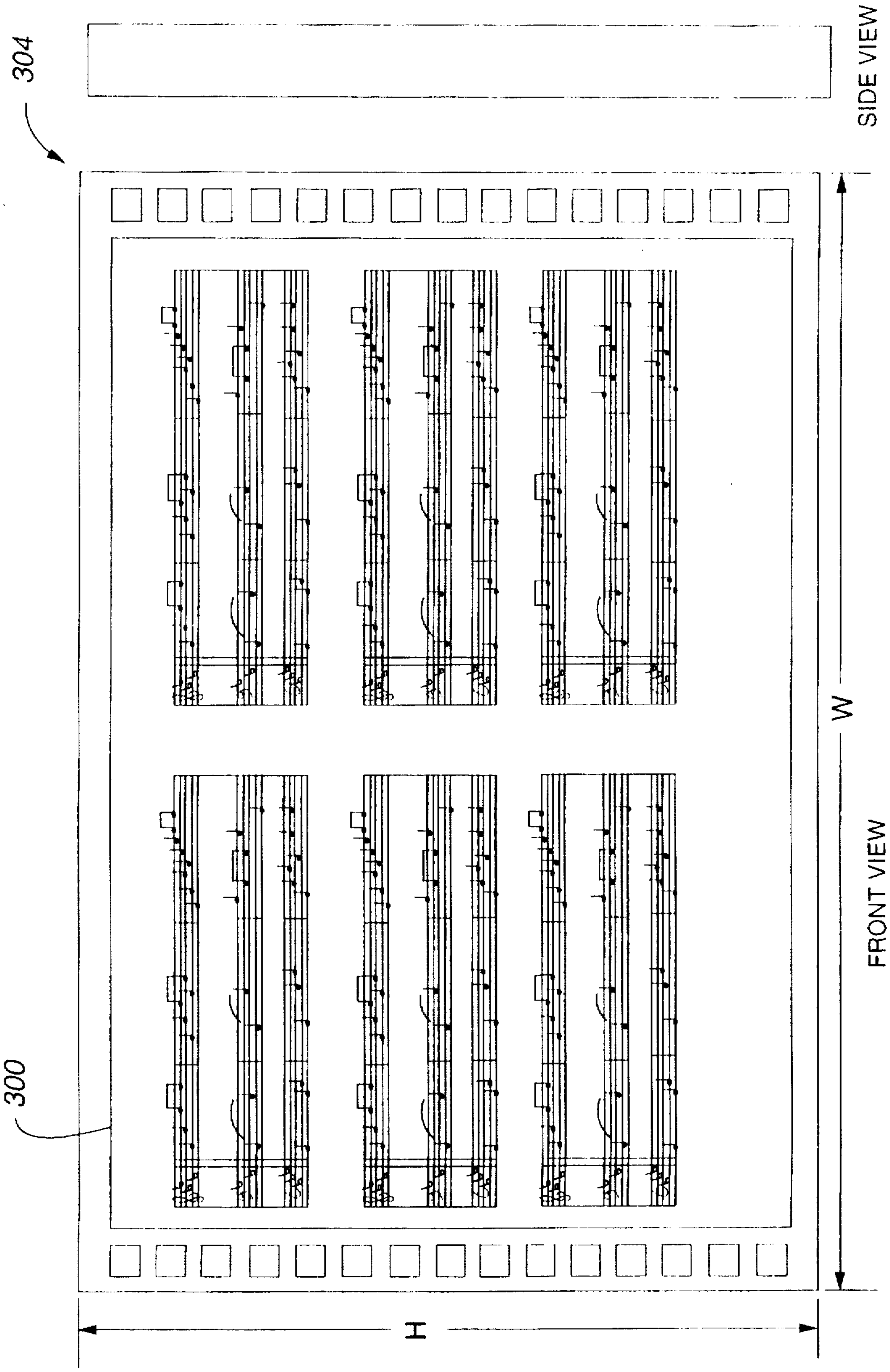
FIG. 13 is a front view of an electronic display stand according to a third embodiment of the present invention.
Figure 14:
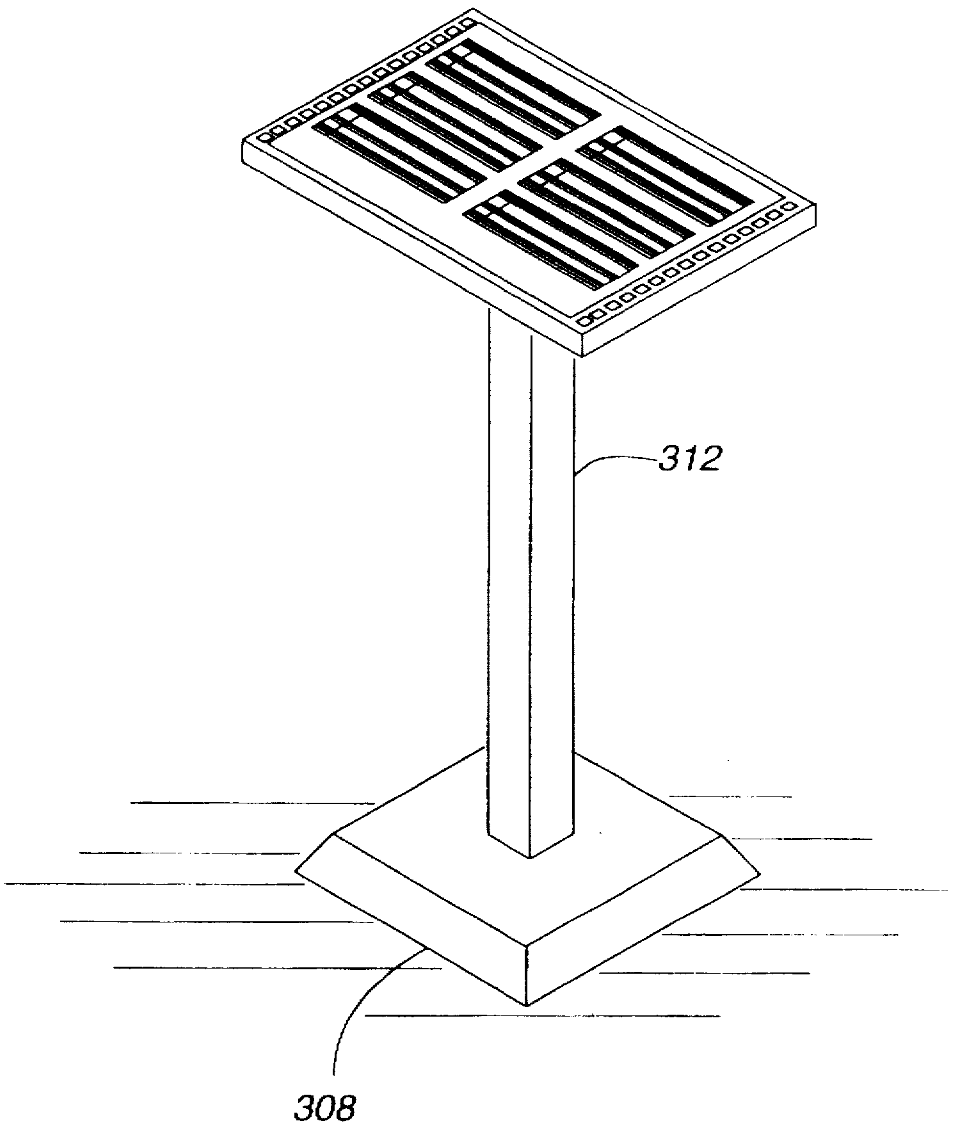
FIG. 14 is a view of the electronic display stand of the third embodiment mounted on a telescopic stand.
Figure 15:
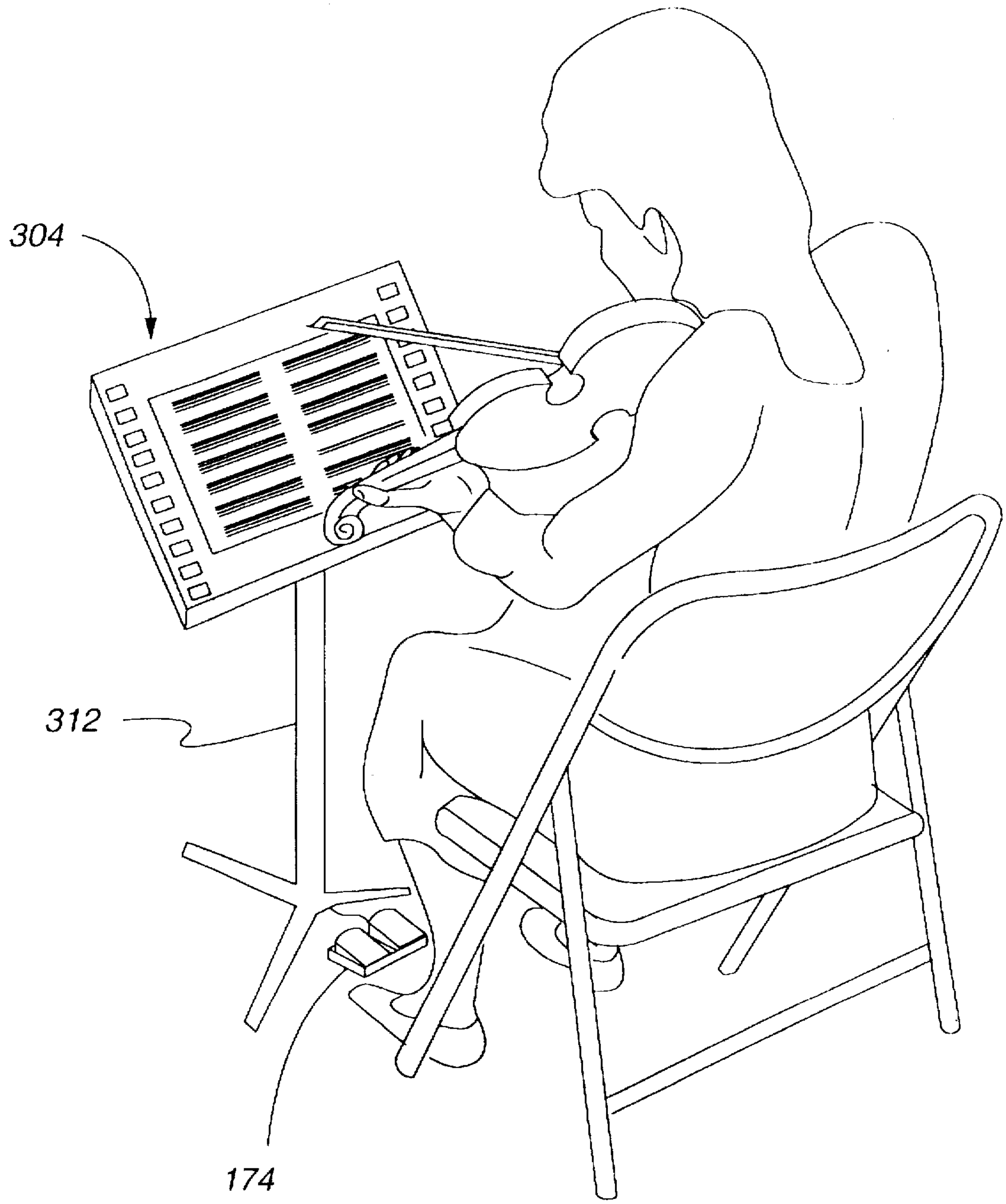
FIG. 15 is another view of the electronic display stand of the third embodiment mounted on a stand.

In a third embodiment depicted in FIGS. 13–15, the display means 300 occupies substantially all of the front of the electronic display stand 304 with the keyboard being located on either side of the display means 300. This embodiment employs a display having a height "H" less than its width "W". To compensate for the reduced width relative to the electronic display stand of the first embodiment, the display is enlarged by occupying more of the stand 304. To reduce the dimensions of the electronic display stand 304, the power supply 308 is contained within the base section of a detachable stand 312. The actuator means 174 can be attached to the electronic display stand 304 through the pedestal of the detachable stand 312 to provide hands-free advancement through the displayed musical notes.

Figure 16:
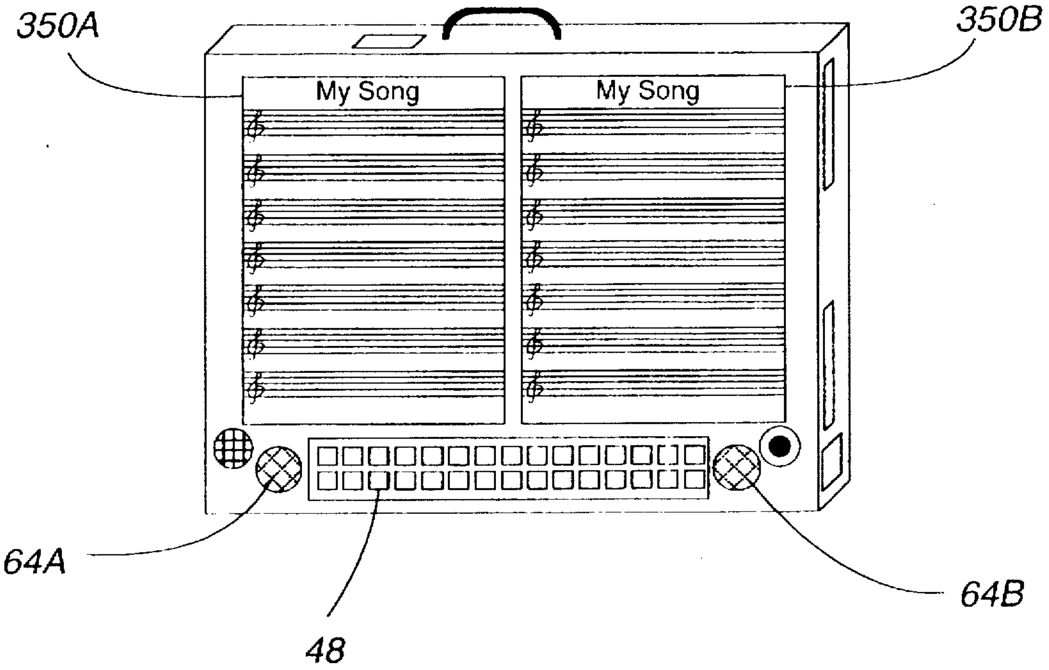
FIG. 16 is a front view of an electronic display stand according to a fourth embodiment of the present invention.

FIG. 16 depicts a fourth embodiment of the present invention that employs dual display means 350*a,b* to display simultaneously adjacent pages of sheet music. This embodiment is the closest replication of a pamphlet of sheet music and therefore may be more desirable to some musicians. At the discretion of the musician, (i) one display means 350*b* can be advanced to a new page of sheet music while the other display means 350*a* displays the preceding page (which was previously displayed on the other display means 350*b*) or (ii) both displays can be simultaneously advanced to pages of sheet music immediately succeeding the previously displayed pages. The latter alternative is the closest to the turning of a sheet music page in a pamphlet which reveals the next two pages of sheet music.

Figure 17:
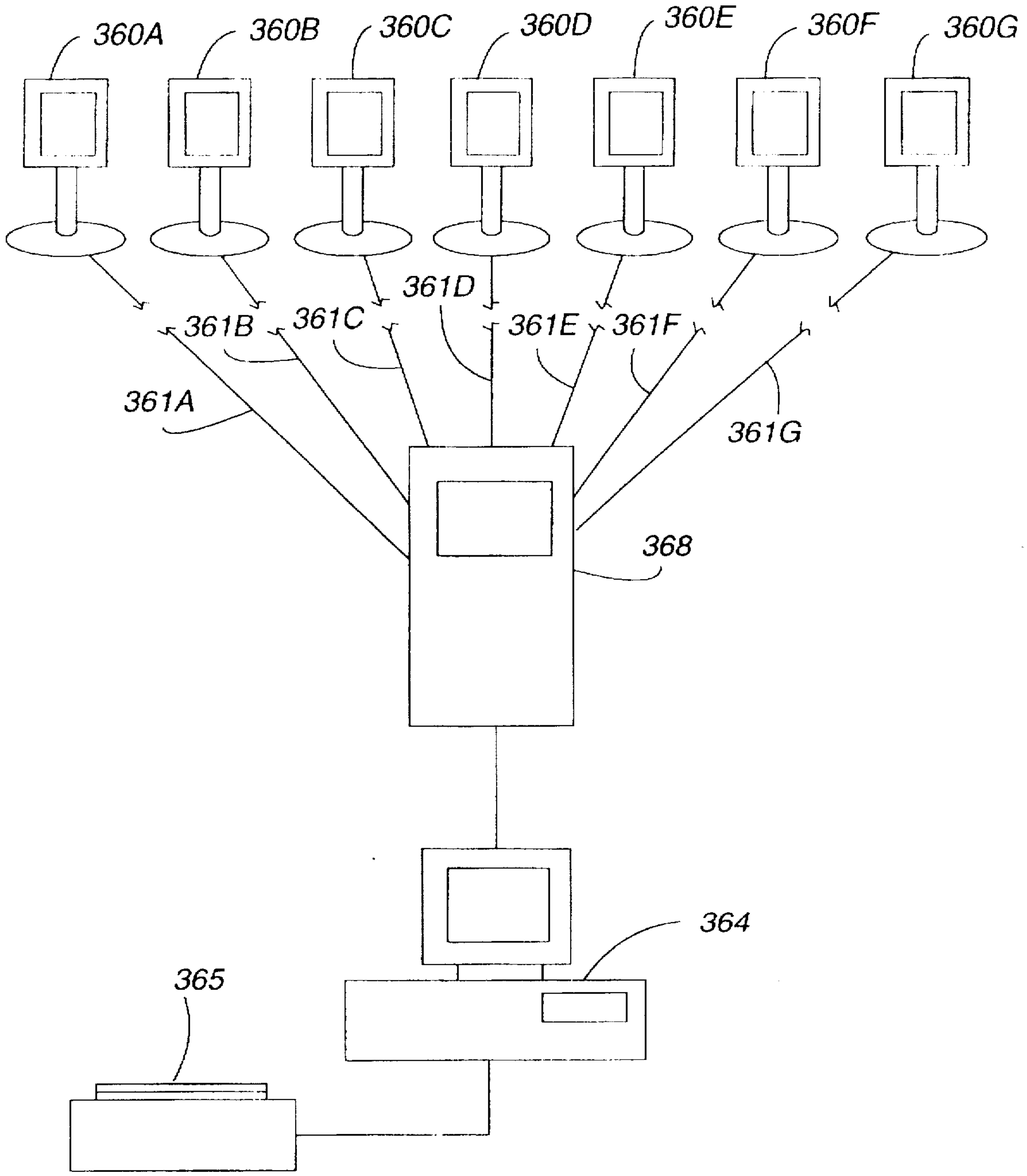
FIG. 17 is a view of a local area network of electronic display stands according to a fifth embodiment of the present invention.

In a fifth embodiment shown in FIG. 17, a plurality of electronic display stands 360*a–g* are in communication with (i.e., networked to) a computer 364. The electronic display stands 360*a–g* can be terminals with no central processing capability (i.e., dumb terminals) or electronic display stands having central processing capability (i.e., intelligent terminals). In the former case, the stands 360*a–g* are nothing more than a display controlled by the computer 364. The stands are networked together by being connected to a device for selecting one of the various signals received from the stands for transmission to the computer 364 (i.e., a VGA multiplexer or separator that is connected to the VGA video port on the computer 364). In the latter case, the stands 360*a–g* can either have limited memory capacity and therefore access the memory of the computer 364 continuously for musical notes for display or have significant memory capacity and download the entire musical piece from the computer 364 only once before the performance. The various stands are networked together by means of network interface cards.

In any event, the computer 364 provides the musical notes to each of the electronic display stands 360*a–g* for display. The computer 364 contains different musical notes for the different instrumental sections, i.e., strings, woodwinds, brass, percussion, etc. Each of the networked electronic display stands 360*a–g* can be advanced through the displayed musical notes independently or collectively as desired.

In one configuration that is particularly useful for orchestras and other multiple instrument bands, the electronic display stands 360*a–g* display different musical notes for different types of musical instruments. The rate of advancement of the displays 360*a–g* through the musical notes can be different or the same, depending upon the musical piece played by the orchestra.

In orchestral applications, the conductor can have the capability of controlling the musical notes displayed on one or more of the electronic display stands 360*a–g* through the conductor's podium 368. As can be seen from FIG. 17, the busline 361*a–g* passes from the computer to the various electronic display stands 360*a–g* through the conductor's podium 368. In this manner, the conductor can control or override the musical notes displayed on the various electronic display stands 360*a–g*. The conductor can also perform search commands to locate specific musical notes and portions of the musical piece for display during rehearsals. He can control the displayed musical notes for the entire orchestra or just for selected instrumental sections in the orchestra.

Alternatively, a selected musician 360*a* in each instrumental section can have the capability to control and/or override the scroll commands of the conductor or the other musicians 360*b–g* in the section. The other musicians in the section have intelligent or dumb terminals provided that they are networked through the selected musician. In this configuration, different instrumental sections can scroll through the musical notes at different rates. As shown in FIG. 17, an optical scanner 365 can be used to input sheet music into the computer 364.

Figure 18A:
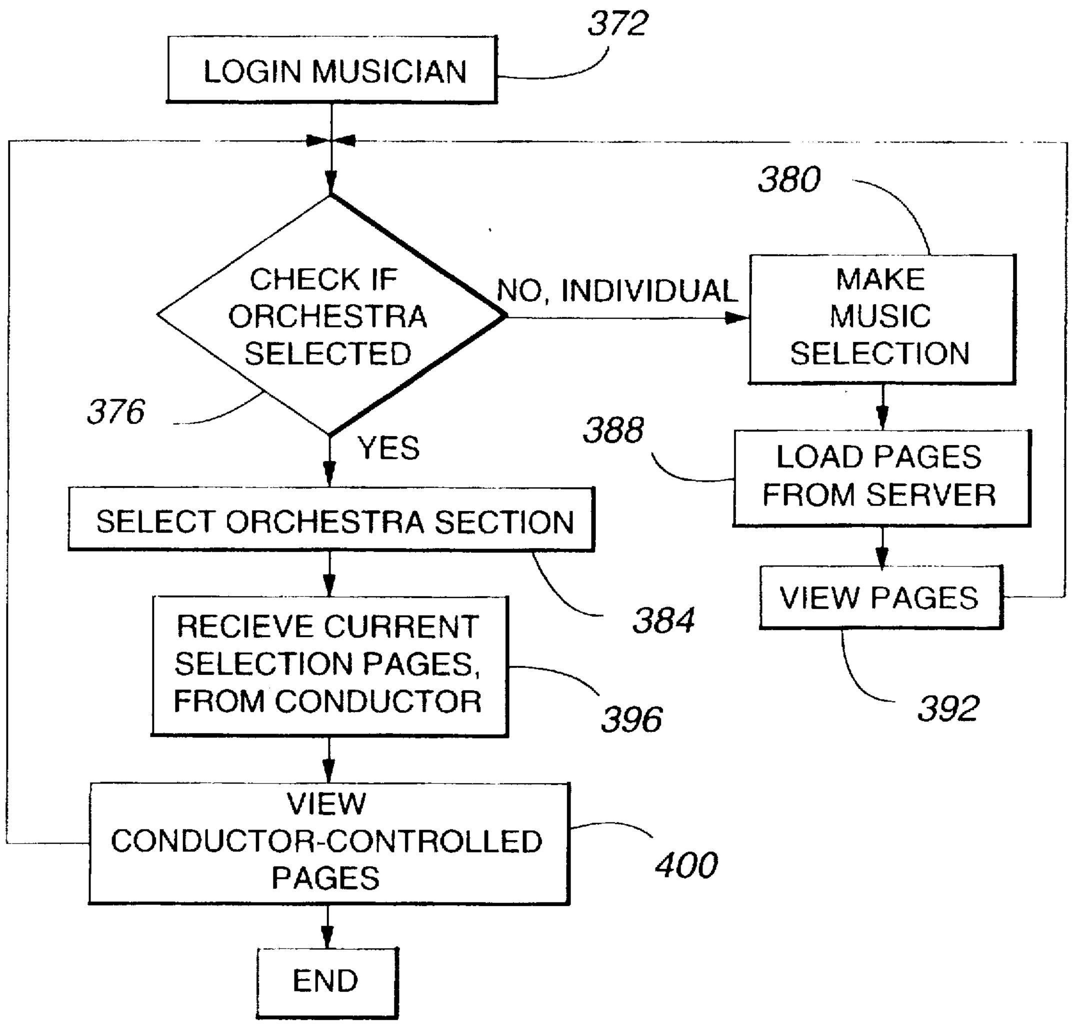
FIG. 18 is another view of the local area network.
Figure 18B:
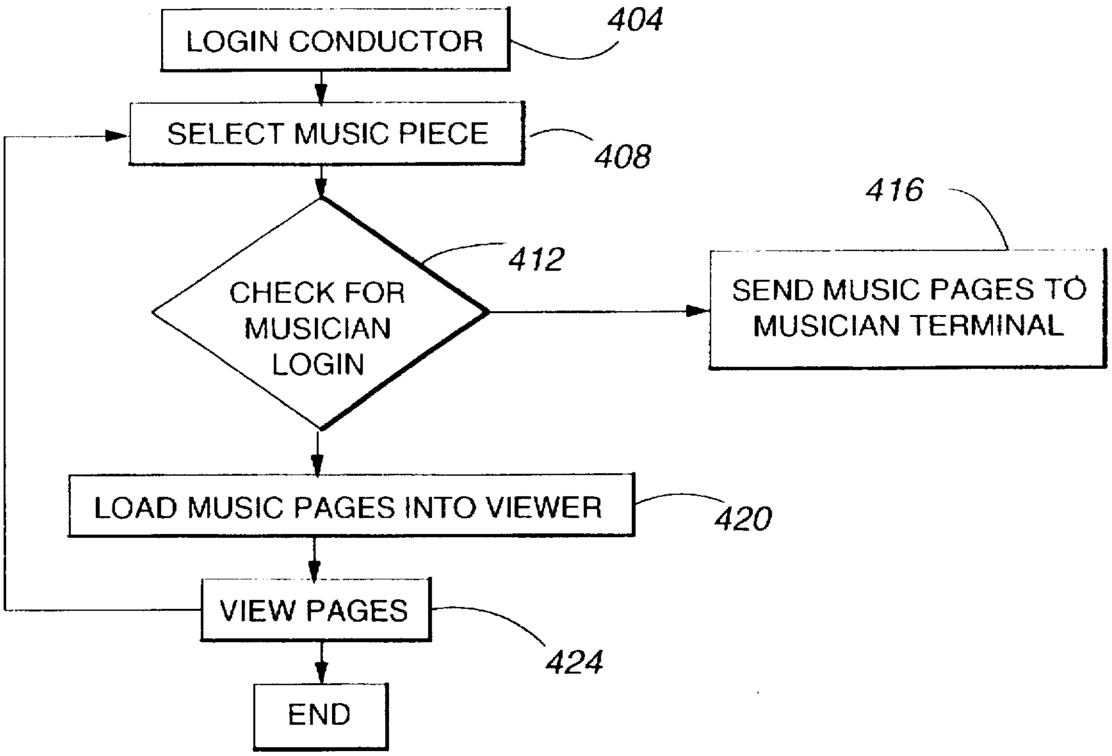

The flow schematic for the software for operating a networked system such as that described above is depicted in FIGS. 18A–B using intelligent terminals. Referring to FIG. 18A, in command box 372 each musician logs into the computer via his respective electronic display stand 360 and chooses in decision box 376 either the orchestra or individual mode. If the individual mode is selected, in command box 380 the musician selects the musical notes desired. The musical notes in command box 388 are displayed and sequentially viewed in command box 392. Upon receipt of a viewing termination command, the stand 360 returns to decision box 376. The notes are accessed from the memory by the central processor and transmitted to the display. If the orchestra mode is selected, in command box 384 the musician selects the orchestra (i.e., instrumental) section in which he plays. He then receives musical notes selected by the conductor and/or himself in command box 396. The musical notes in command box 400 are sequentially viewed by the musician. Upon receipt of a viewing termination command, the stand 360 returns to decision box 376. Referring to FIG. 18B, the conductor logs in command box 404 and selects the musical piece for display in command box 408. In decision box 412, the computer determines what electronic display stands have had musicians log into the network and in command box 416 sends the musical notes selected by the conductor to those stands. The musical notes in command box 420 are loaded into the display means of the conductor's podium. The musical notes in command box 424 are viewed sequentially by the conductor. Upon receipt of a viewing termination command, the podium returns to command box 408.

Figure 19:
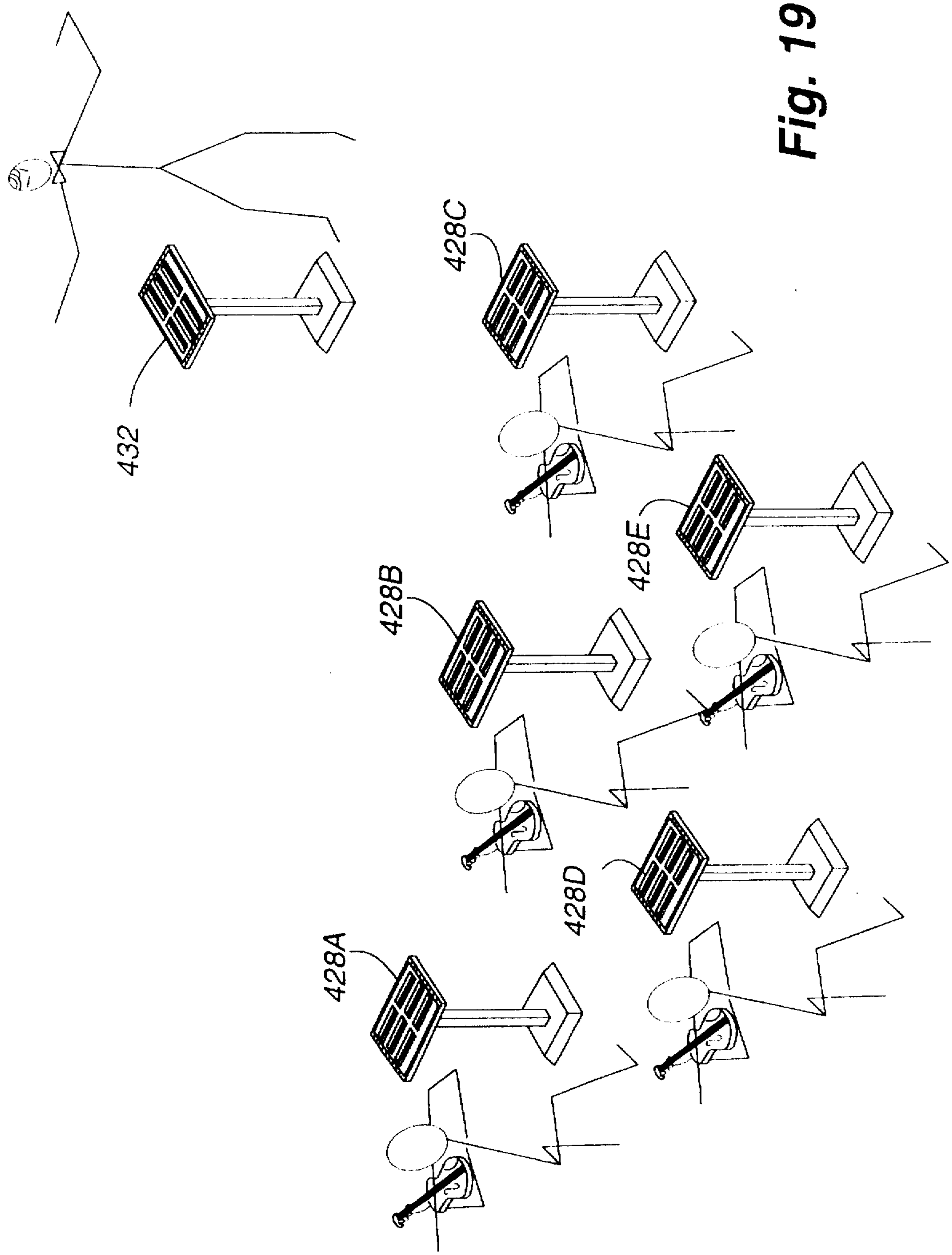
FIG. 19 is the flow schematic for the software to operate the computer in the local area network.

FIG. 19 depicts the use of self-contained stands 428*a–e* and podium 432 by an orchestra that are not networked together as described above. The stands are intelligent with sufficient memory capacity to independently store the musical piece to be played.

Figure 20:
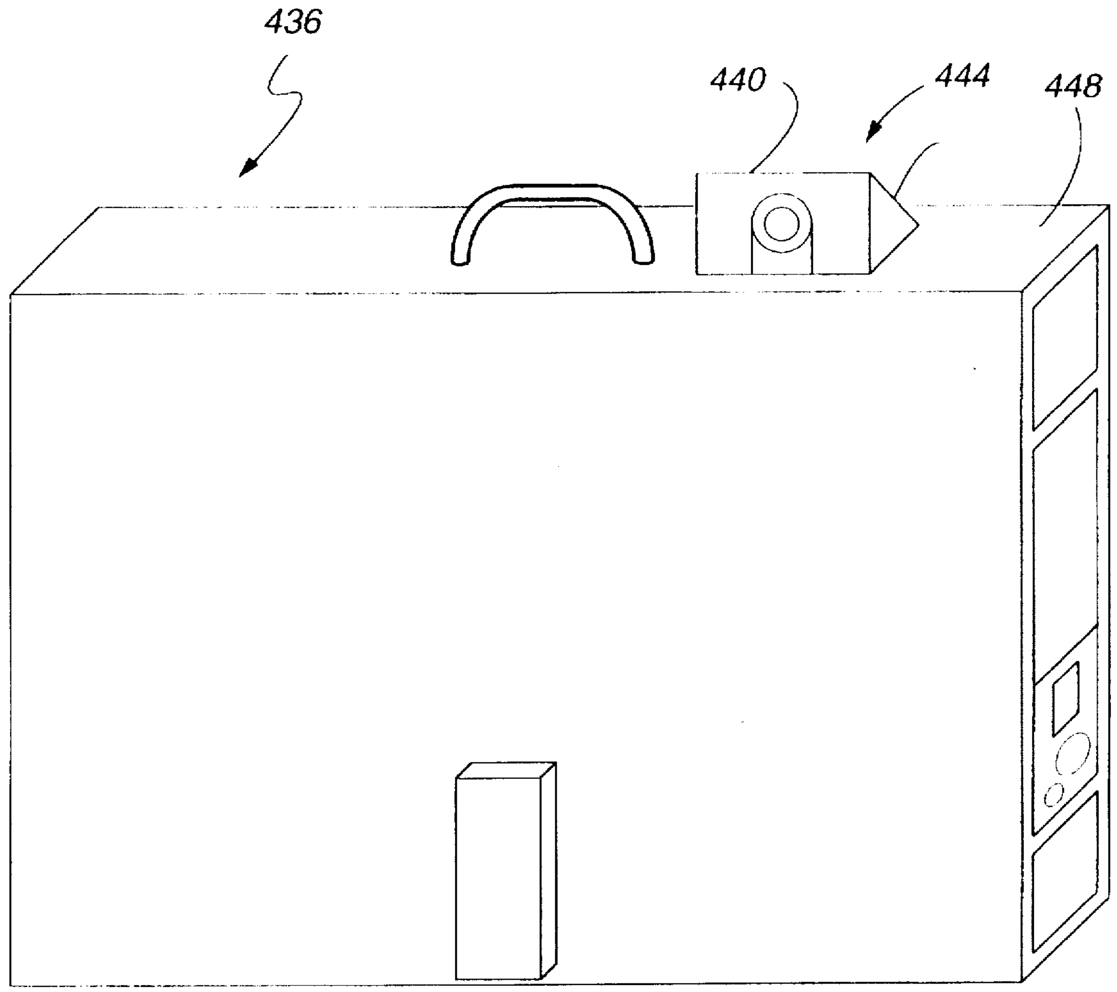
FIGS. 20–21 depict a sixth embodiment of the present invention for use not only in musical applications but also in other applications.

FIGS. 8A–B and 20 and 21 depict a sixth embodiment of the present invention that is suitable for use not only in musical applications but also in group or public presentations. The stand 436 includes a projector means 440 for projecting displayed information on a viewing surface. The projector means can be rotated into the viewing position as shown in FIG. 20 or into a non-viewing position. In the non-viewing position, the back surface 444 of the device is level with the surface of the housing 448 to protect the lens 456.

Figure 21:
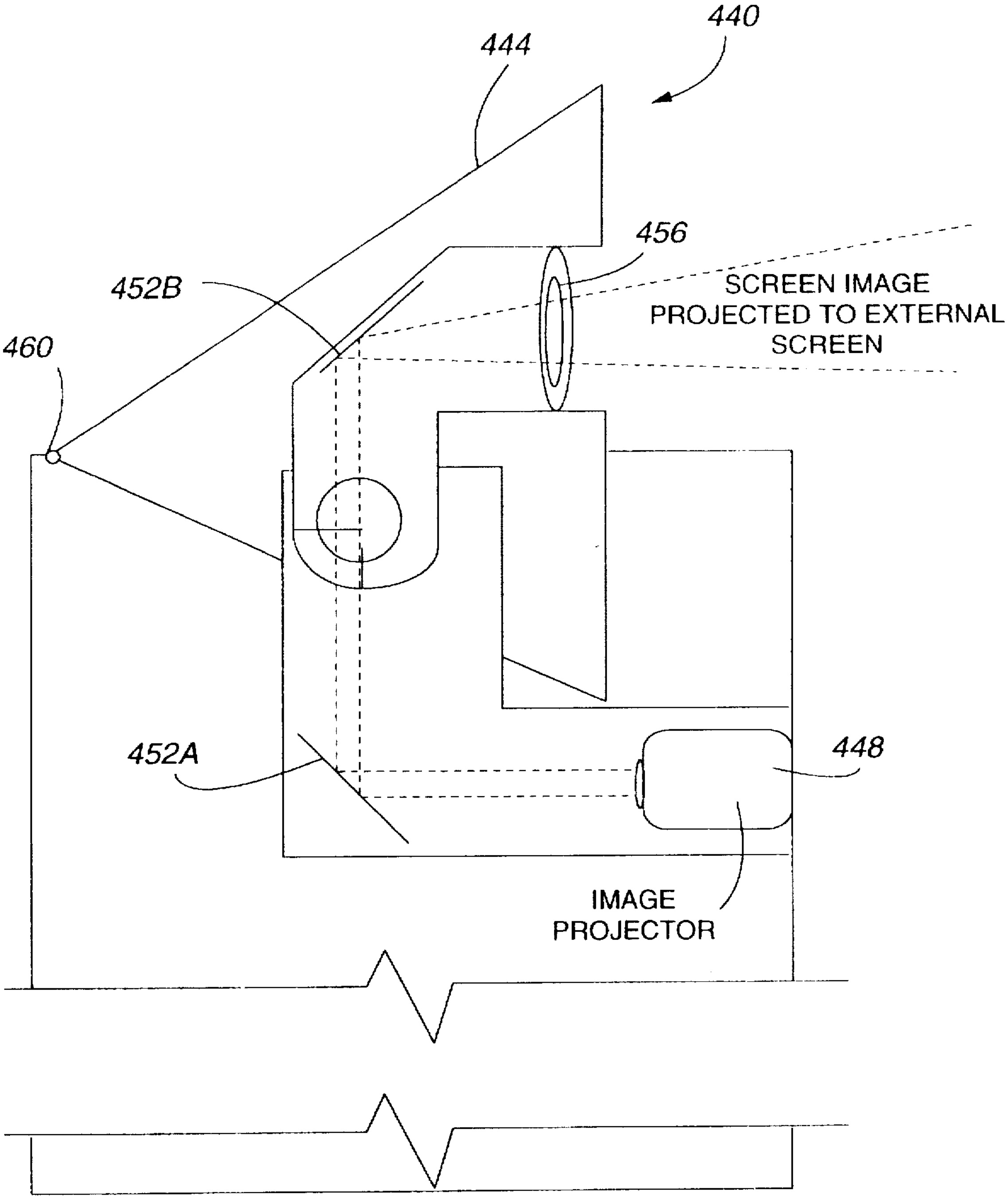

Referring to FIG. 21, the projecting means 440 includes the image projector 448 that receives the displayed image and the image to mirrors 452*a,b* and finally to the lens 456. The projecting means 440 is hinged about the hinge 460 to permit it to be raised for image projection or lowered for storage.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A portable device for storing and retrieving music, comprising:

memory means for storing a plurality of musical notes corresponding to a musical composition;

central processing means for accessing said memory means to retrieve said musical notes from said memory means and store one or more additional musical notes in said memory means;

first and second display means for displaying musical notes retrieved by said central processing means, wherein the first display means controls the display of musical notes on a second display means; and actuator means in communication with said central processor means for advancing a displayed musical score, wherein said actuator means can be actuated by the sound of a portion of said musical notes to permit said displayed musical score to be advanced while a musician is playing a musical instrument.

2. The device as claimed in claim 1, wherein said first display means has a width and a height and said width is less than said height.

3. The device as claimed in claim 2, wherein said width is at least 8.5 inches and said height is at least 11 inches.

4. The device as claimed in claim 1, wherein said first display means comprises at least two separate screens to permit at least two pages of musical notes to be viewed at the same time.

5. The device as claimed in claim 1, further comprising:

a keyboard to input musical notes into said memory means and wherein said memory means comprises a permanent storage medium.

6. The device as claimed in claim 1, further comprising:

a housing for enclosing said memory means, central processing means and first display means and wherein at least a portion of said actuator means is external to said housing.

7. The device as claimed in claim 6, wherein said actuator means is located at a distance from said housing.

8. The device as claimed in claim 6, wherein said actuator means is mounted on a musical instrument.

9. The device as claimed in claim 6, wherein said actuator means is actuated by a foot of said musician.

10. The device as claimed in claim 1, further comprising:

scanning means in communication with said central processor means for inputting musical notes into said memory means.

11. The device as claimed in claim 1, further comprising:

a printer output port in communication with said central processor means for outputting said musical notes to an external printer.

12. The device as claimed in claim 1, wherein said display means includes at least two separate screens to permit at least two sequential pages of musical notes to be viewed at the same time and further comprising:

scroll control means for selectively controlling a scrolling speed at which the display means scrolls through the displayed musical notes.

13. A system for simultaneously providing musical notes to a plurality of musicians, comprising:

a computer including a memory means containing a plurality of musical notes corresponding to a musical composition and a plurality of discrete display means for displaying simultaneously said musical notes to a plurality of musicians, said display means being in communication with said computer wherein at least two display means simultaneously display musical notes for different types of musical instruments wherein a first display means controls the display of musical notes on a second display means.

14. The system as claimed in claim 13, wherein said first display means and said second display means display musical notes for the same type of musical instruments.

15. The system as claimed in claim 13, wherein at least two of said display means advance through displayed musical notes at different rates.

16. The system as claimed in claim 13, wherein said at least two display means display musical notes for different types of musical instruments.

17. The system as claimed in claim 13, wherein said display means are remotely located from said computer.

18. A portable device for storing and retrieving information during a presentation, comprising:

memory means for storing selected information;

central processing means for accessing said memory means to retrieve said information from said memory means and store additional information in said memory means;

display means for displaying information retrieved by said central processing means;

a housing for enclosing said memory means, central processing means, and display means;

a projector means for projecting said information on said display onto a viewing surface, wherein said projector means is located in said housing; and actuator means in communication with said display means for scrolling through the information displayed on the viewing surface, wherein said actuator means is remotely actuated by said user to permit said user to selectively scroll through the displayed information during a presentation.

19. The device as claimed in claim 18, wherein said display means is no less than 8.5 inches in width and no less than 11 inches in height to display said information.

20. A system for simultaneously providing musical notes to a plurality of musicians, comprising:

a computer including a memory means containing a plurality of musical notes corresponding to a musical composition, and a plurality of display means for displaying said musical notes to a plurality of musicians, said display means being in communication with said computer, wherein a first display means controls the display of musical notes on a second display means.

21. The system as claimed in claim 20, wherein said at least two display means display musical notes for different types of musical instruments.

22. A system for simultaneously providing musical notes to a plurality of musicians, comprising:

a computer including a memory means containing a plurality of musical notes corresponding to a musical composition, and a plurality of display means for displaying said musical notes to a plurality of musicians, said display means being in communication with said computer, wherein at least two of said display means that advance through displayed musical notes at different rates.

* * * * *